(12) United States Patent
Jiang (10) Patent No.: US 11,646,473 B2
(45) Date of Patent: May 9, 2023

(54) ELECTRODE ASSEMBLY

(71) Applicant: NINGDE AMPEREX TECHNOLOGY LIMITED, Ningde (CN)

(72) Inventor: Jing Jiang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 37 days.

(21) Appl. No.: 16/825,949

(22) Filed: Mar. 20, 2020

(65) Prior Publication Data
US 2020/0313145 A1 Oct. 1, 2020

(30) Foreign Application Priority Data
Mar. 29, 2019 (CN) .......................... 201910253069.8

(51) Int. Cl.
*H01M 50/531* (2021.01)
*H01M 50/46* (2021.01)
(Continued)

(52) U.S. Cl.
CPC ......... *H01M 50/531* (2021.01); *H01M 50/46* (2021.01); *H01M 50/543* (2021.01); *H01M 50/586* (2021.01); *H01M 2200/00* (2013.01)

(58) Field of Classification Search
CPC .. H01M 50/531; H01M 50/536; H01M 50/54; H01M 2200/00; Y02E 60/10
See application file for complete search history.

(56) References Cited

U.S. PATENT DOCUMENTS

2006/0099504 A1* 5/2006 Kim ...................... H01M 50/60
29/623.1
2015/0037658 A1* 2/2015 Maeda .............. H01M 10/0463
429/161
(Continued)

FOREIGN PATENT DOCUMENTS

CN 1755964 A 4/2006
CN 201191634 Y 2/2009
(Continued)

OTHER PUBLICATIONS

Machine Translation of Jiang (Year: 2016).*
(Continued)

*Primary Examiner* — Matthew T Martin
*Assistant Examiner* — Ankith R Sripathi
(74) *Attorney, Agent, or Firm* — Morgan, Lewis & Bockius LLP (57) ABSTRACT

The present disclosure provides an electrode assembly including a first electrode sheet, the first electrode sheet includes a first current collector and a first tab. The first tab extends from a surface of the first electrode sheet and electrically connected with the first current collector, a plurality of tabs are provided and the number of the first tabs is q. The plurality of first tabs include a first breakable tab, the first breakable tab includes a breakable part and a first insulating layer, the first insulating layer wraps the breakable part, the breakable part includes a first segment and a second segment, the first segment is connected with the second segment, and an included angle between the first segment and the second segment is less than 90°. The number of first breakable tabs is p, and $p/q \leq 1/2$.

20 Claims, 4 Drawing Sheets

(51) Int. Cl.
 H01M 50/543 (2021.01)
 H01M 50/586 (2021.01)

(56) References Cited

U.S. PATENT DOCUMENTS

| | | | | |
|---|---|---|---|---|
| 2015/0340663 | A1* | 11/2015 | Minagata | H01M 10/0413 429/163 |
| 2016/0164133 | A1* | 6/2016 | Matsumoto | H01M 10/049 429/179 |
| 2018/0375070 | A1* | 12/2018 | Wakimoto | H01M 50/538 |
| 2019/0036148 | A1* | 1/2019 | Kim | H01M 10/04 |
| 2020/0020901 | A1* | 1/2020 | Suzuki | H01M 50/50 |
| 2020/0044275 | A1* | 2/2020 | Kim | H01M 50/103 |
| 2020/0067066 | A1* | 2/2020 | Kim | H01M 50/124 |
| 2020/0328396 | A1* | 10/2020 | Cho | H01M 50/531 |
| 2021/0305620 | A1* | 9/2021 | Taniuchi | H01M 4/0404 |
| 2022/0037750 | A1* | 2/2022 | Harima | H01M 50/184 |

FOREIGN PATENT DOCUMENTS

| | | | | |
|---|---|---|---|---|
| CN | 102163736 | A | 8/2011 | |
| CN | 104409768 | A | 3/2015 | |
| CN | 105261726 | * | 1/2016 | H01M 2/26 |
| CN | 106159179 | * | 11/2016 | H01M 10/052 |
| CN | 206134799 | U | 4/2017 | |
| CN | 206250283 | U | 6/2017 | |
| CN | 206332097 | U | 7/2017 | |
| CN | 108155334 | A | 6/2018 | |
| JP | 2013122910 | A | 6/2013 | |
| KR | 20130063754 | * | 6/2013 | H01M 10/052 |
| KR | 20160032889 | A | 3/2016 | |
| WO | WO2013018551 | A1 | 2/2013 | |

OTHER PUBLICATIONS

Machine Translation of Hyun (Year: 2013).*
Machine Translation of Aiming (Year: 2016).*
Office Action, CN201910253069.8, dated Sep. 9, 2021, 5 pgs.
Ningde New Energy Technology Co. Ltd., Notification to Grant Patent Right for Invention, CN201910253069.8, dated Nov. 17, 2021, 6 pgs.

* cited by examiner

ELECTRODE ASSEMBLY

CROSS-REFERENCE TO RELATED APPLICATION

This application claims priority to and benefits of Chinese Patent Application Serial No. 201910253069.8, filed with National Intellectual Property Administration of PRC on Mar. 29, 2019, the entire content of which is incorporated herein by reference.

FIELD

The present disclosure relates to a field of battery technology, more particularly to an electrode assembly.

BACKGROUND

In order to meet an application of high-rate charge and discharge, an electrode assembly in a battery pack mostly uses a plurality of tabs for multi-channel current output. A plurality of layers of tabs are cut and extracted from a base material, and the tabs with the same polarity are stacked together and then are welded and adapted to realize current output. Generally, the tab is easily broken or easily contacted with a housing and a tab with the opposite polarity, resulting in excessively high resistance and voltage or short circuit, which will cause serious safety risk. Furthermore, an existing electrode assembly has low energy density, so that room for improvement exists.

SUMMARY

The present disclosure provides an electrode assembly with higher energy density and higher safety performance.

The electrode assembly according to embodiments of the present disclosure includes a first electrode sheet including a first current collector; a first tab extending from a surface of the first electrode sheet and electrically connected with the first current collector, a plurality of tabs being provided and the number of the first tabs being q; in which the plurality of first tabs include a first breakable tab including a breakable part and a first insulating layer, the first insulating layer wraps the breakable part, the breakable part includes a first segment and a second segment connected with the first segment, and an included angle between the first segment and the second segment is less than 90°; the number of first breakable tab is p, and $p/q \leq 1/2$.

The electrode assembly according to embodiments of the present disclosure has higher energy density and higher safety performance.

According to some embodiments of the present disclosure, $p/q=a$, $0.2 \leq a \leq 0.4$.

According to some embodiments of the present disclosure, at least one first tab includes a bending part, the bending part includes a third segment and a fourth segment connected with the third segment, an included angle between the third segment and the fourth segment is greater than 90°, and the fourth segment is electrically connected with the first current collector.

According to some embodiments of the present disclosure, the fourth segment has a first end connected with a first end of the third segment, and a second end electrically connected to the first current collector.

According to some embodiments of the present disclosure, the first breakable tab includes the bending part, the third segment is connected to the second segment, and the third segment and the second segment are collinear.

According to some embodiments of the present disclosure, at least one first insulating layer covers the bending part.

According to some embodiments of the present disclosure, the first electrode sheet further includes a first active material layer located on a surface of the first current collector, and at least one first insulating layer overlaps the first active material layer.

According to some embodiments of the present disclosure, the electrode assembly further includes a second electrode sheet, and the first insulating layer is located between the first electrode sheet and the second electrode sheet.

According to some embodiments of the present disclosure, in a direction in which the first tab extends out of the first electrode sheet, a minimum value of a length of the first insulating layer beyond the first active material layer is L1, a maximum value of a length of the second electrode sheet beyond the first active material layer is L2, and a distance from a vertex of the included angle between the first segment and second segment to the second electrode sheet is L3, and $L1-L2 \geq L3$.

According to some embodiments of the present disclosure, a total thickness of the first tabs stacked at a connection position between the first segment and the second segment is T2, and a minimum value of a perpendicular distance between the bending part and the breakable part in a direction in which the first tab extends out of the first electrode sheet is L4, and L4 is greater than or equal to T2.

According to some embodiments of the present disclosure, $0.8*(L1-L2) \geq L3 \geq L4 \geq 1.5*T2$.

According to some embodiments of the present disclosure, the first tab is configured to be connected with an adapter sheet so as to output current of the electrode assembly.

According to some embodiments of the present disclosure, the first segment has a first end connected to a first end of the second segment, and a second end connected to the adapter sheet.

According to some embodiments of the present disclosure, a welding overlap width of the adapter sheet and the first tab is controlled between 30% and 80% of a thickness of the electrode assembly.

According to some embodiments of the present disclosure, a shape of the welding spot is quadrilateral, circular or rhombus.

According to some embodiments of the present disclosure, a width of the adapter sheet is 50%-100% of a width of the first tab.

According to some embodiments of the present disclosure, two corners of the first tab is blunted during cutting.

Embodiments of the present disclosure further provide another electrode assembly. The electrode assembly includes a plurality of first electrode sheets stacked in an up-and-down direction, each of the plurality of first electrode sheets comprising a first current collector; and a plurality of first tabs corresponding to the plurality of first electrode sheets, each of the plurality of first tabs being electrically connected with the first current collector of the respective first electrode sheet, and the number of the first tabs being q. The plurality of first tabs comprise a plurality of first breakable tabs, each of the plurality of first breakable tabs including a breakable part, the breakable part includes a first segment and a second segment connected with the first segment, and an included angle between the first segment and the second segment is less than 90°; the number of first breakable tabs is p, and $p/q \leq 1/2$.

According to some embodiments of the present disclosure, the plurality of first tabs are stacked and connected with each other to connect the plurality of first electrode sheets together so as to complete current collection of the plurality of first electrode sheets.

According to some embodiments of the present disclosure, each of the plurality of first breakable tabs further includes a first insulating layer wrapping the breakable part.

For the electrode assembly according to embodiments of the present disclosure, the breakable part on the first electrode sheet is reasonably divided into two small segments, and the angle formed between the two small segments is reasonably limited, so as to reduce the risk of breakage of the breakable part after bending, improve the bending reliability of the first tab, and further effectively improve the safety performance of the electrode assembly.

DETAILED DESCRIPTION

Embodiments of the present disclosure will be described in detail and examples of embodiments are illustrated in the drawings. The same or similar elements and the elements having the same or similar functions are denoted by like reference numerals throughout the descriptions. Embodiments described herein with reference to the drawings are explanatory, serve to explain the present disclosure, and cannot be construed to limit the present disclosure.

In the specification, it is to be understood that terms such as "transverse", "length", "width", "thickness", "upper", "lower" and "top" should be construed to refer to the orientation as then described or as shown in the drawings under discussion. These relative terms are for convenience and simplification of description of the present disclosure, and do not require that the present disclosure is constructed or operated in a particular orientation, thus cannot be construed to limitation of the present disclosure.

In addition, terms such as "first" and "second" are used herein for purpose of description and are not intended to indicate or imply relative importance or significance or to imply the number of indicated technical features. Thus, the feature defined with "first" and "second" may include one or more this feature. In the description of the present disclosure, the term "a plurality of" means at least two, for example, two or three, unless specified otherwise.

In the present invention, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements or interaction of two elements, which can be understood by those skilled in the art according to specific situations.

An electrode assembly 100 according to embodiments of the present disclosure will be described below with reference to the drawings.

The electrode assembly 100 according to embodiments of the present disclosure includes a plurality of first electrode sheets 1, and the plurality of first electrode sheets are stacked in an up-and-down direction to form a part of the electrode assembly 100. The first electrode sheets 1 may be positive electrode sheets; of course, the first electrode sheets 1 may also be negative electrode sheets.

Figure 1:
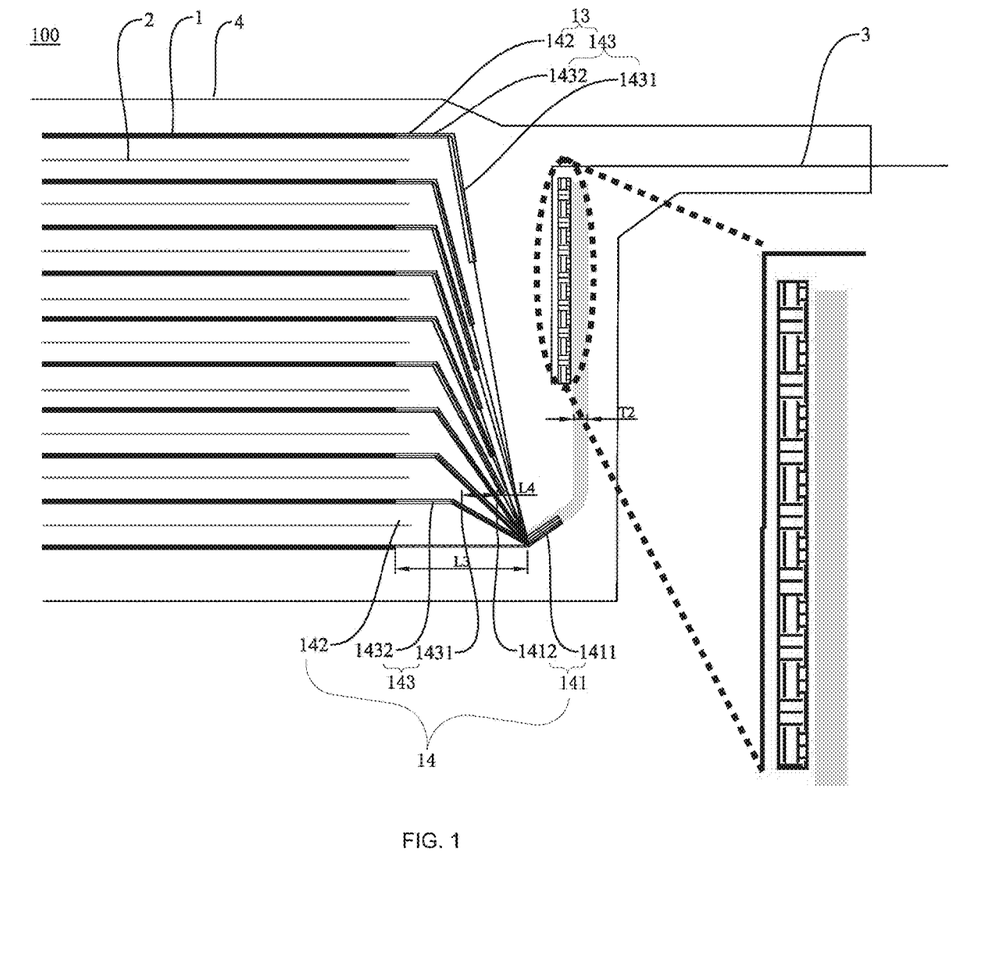
FIG. 1 is a partial structural schematic diagram of an electrode assembly according to embodiments of the present disclosure.
Figure 2:
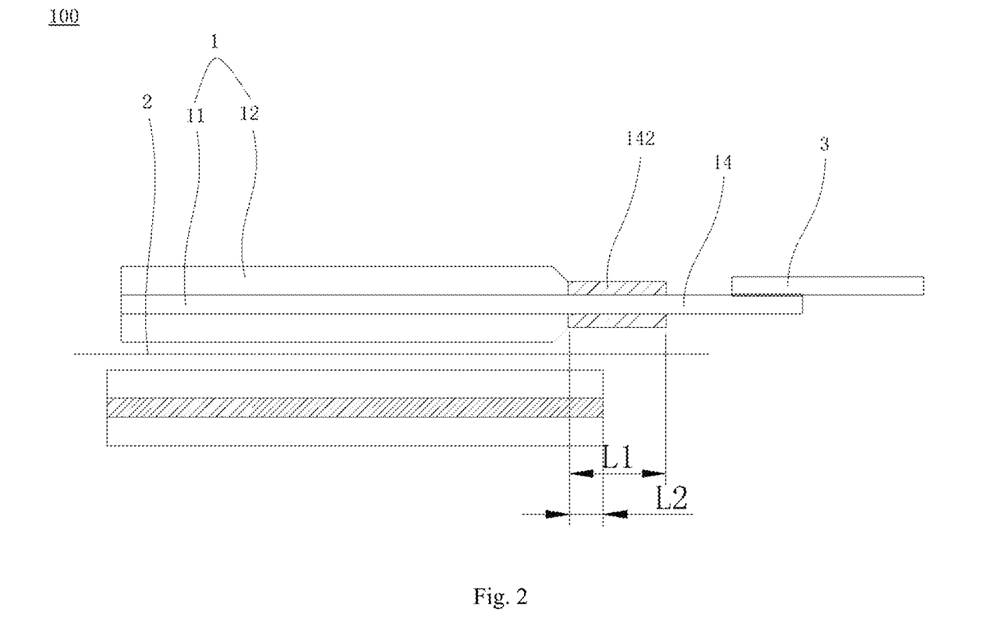
FIG. 2 is a partial structural schematic diagram of an electrode assembly according to embodiments of the present disclosure.

As illustrated in FIGS. 1 and 2, each first electrode sheet 1 includes a first current collector 11 and a first active material layer 12 provided on a surface of the first current collector 11. The first active material layer 12 is configured to generate a current, and the first current collector 11 is adapted to be in sufficient contact with the first active material layer 12 to collect the current generated by the first active material layer 12 so as to form a large current to be output to an outside of the electrode assembly 100.

Further, each first electrode sheet 1 is provided with a first tab 13, and the plurality of first tabs 13 are adapted to be stacked and connected with each other to connect the plurality of first electrode sheets 1 together so as to complete current collection of the plurality of first electrode sheets 1. In addition, the first tab 13 is also adapted to be connected with an adapter sheet 3, so that the adapter sheet 3 can transfer the current of the first electrode sheet 1 to the outside of the electrode assembly 100, so as to output the current of the electrode assembly 100.

Still further, referring to FIG. 1, the plurality of first tabs 13 include a plurality of first breakable tabs 14. The first breakable tab 14 is, as the name implies, a tab that is easily broken. Since the plurality of first tabs 13 are stacked in the electrode assembly 100 while the plurality of first tabs 13 have only one output terminal, in order to ensure normal current collection and output of the first tabs 13 and avoid an electrical connection between the first tabs 13 and a housing 4, the first tabs 13 need to be bent, and part of the first tabs 13 (the first breakable tab 14) will inevitably be damaged or broken during bending, causing internal resistance at the first breakable tab 14 to increase, causing voltage loss at the first breakable tab 14 to increase, and affecting electric capacity and safety performance of the electrode assembly 100.

The first breakable tab 14 includes a breakable part 141, and the breakable part 141 is a portion of the first breakable tab 14 that is prone to breakage. In order to increase strength of the breakable part 141, the embodiment of the present disclosure provides a first insulating layer 142 on the breakable part 141, and the first insulating layer 142 wraps the breakable part 141 to achieve a better reinforcing effect and prevent the breakable part 141 from breaking.

In addition, the first insulating layer 142 also has an insulating function, which can effectively prevent the first tab 13 from being electrically connected to the housing 4 and other tabs, thus effectively protecting the electrode assembly 100 and enabling the normal output of current. As illustrated in FIG. 1, the breakable part 141 includes a first segment 1411 and a second segment 1412. A first end of the first segment 1411 is connected to a first end of the second segment 1412, and a second end of the first segment 1411 is adapted to be connected to the adapter sheet 3 to output the current to the outside of the electrode assembly 100.

The first bending occurs between the first segment 1411 and the second segment 1412, and an included angle between the first segment 1411 and the second segment 1412 is less than 90°. Therefore, by controlling the included angle between the first segment 1411 and the second segment 1412 within the range of less than 90°, it can be ensured that the bending and contraction of the first electrode sheet 1 in the thickness direction will not come into contact with the housing 4, and effectively shorten space in the electrode assembly 100 occupied by the first electrode sheet 1 in a transverse direction, so as to realize the function of improving energy density of the electrode assembly 100.

Furthermore, by controlling a bending angle within this range and cooperating with the reinforcing effect of the first insulating layer 142, the reliability level at the breakable parts 141 of the plurality of first breakable tabs 14 can be improved, so as to reduce risk of breakage of the breakable part 141 after bending while improving a space utilization rate, i.e. a volume energy density of the electrode assembly 100, and to improve the bending reliability of the first tab 13. Specifically, the number of the first tabs 13 is q, and the number of the first breakable tabs 14 is p, where $p/q \leq 1/2$. That is, the number of the first breakable tabs 14 should be reasonably controlled in the electrode assembly 100, such that the number of the first breakable tabs 14 is less than half of the total number of the first tabs 13, so as to ensure the bending reliability and prevent the excessive breakage of the first tabs 13 from affecting the electric capacity and safety performance of the electrode assembly 100.

According to the electrode assembly 100 of the embodiments of the present disclosure, the electrode assembly 100 has higher energy density and higher safety performance.

According to some embodiments of the present disclosure, $p/q=a$, and $0.2 \leq a \leq 0.4$. That is, the number of the first breakable tabs 14 is controlled between 20% and 40% of the total number of the first tabs 13, so as to ensure the overall bending reliability of the first tabs 13 and prevent the excessive breakage of the first tabs 13 from affecting the capacity and safety performance of the electrode assembly 100.

According to some embodiments of the present disclosure, as illustrated in FIG. 1, at least one first tab 13 includes a bending part 143, and the bending part 143 is a second bending point of the first tab 13 during the mounting, so as to cooperate with the first bending point formed at the breakable part 141, so that the first electrode sheet 1 can be arranged in the housing 4 with less space, thereby improving the energy density of the electrode assembly 100.

According to some embodiments of the present disclosure, further referring to FIG. 1, the bending part 143 includes a third segment 1431 and a fourth segment 1432. A first end of the third segment 1431 is connected to A first end of the fourth segment 1432, and a second end of the fourth segment 1432 is electrically connected to the first current collector 11. An included angle between the third segment 1431 and the fourth segment 1432 is greater than 90°. The bending part 143 is formed between the third segment 1431 and the fourth segment 1432 to form a second bending point so as to cooperate with the first bending point of the breakable part 141, thus two bending points distributed along the transverse direction are formed in total, so that the mutual cooperation of limiting angles of the first bending point and the second bending point can ensure the bending safety of the first tab 13 and reduce the space occupied by the first tab 13 in the housing 4 as much as possible, thereby achieving the purpose of improving the energy density of the electrode assembly 100.

According to some embodiments of the present disclosure, as illustrated in FIGS. 1 and 2, the first breakable tab 14 includes a bending part 143, so that the bending part 143 can cooperate with the breakable part 141 to make the internal space of the electrode assembly 100 occupied by the first breakable tab 14 smaller after bending so as to achieve the purpose of increasing the energy density.

A second end of the third segment 1431 is connected to a second end of the second segment 1412, and the third segment 1431 and the second segment 1412 are collinear. That is, there is no bending point between the second segment 1412 and the third segment 1431. Combined with the connection form of the breakable part 141, it can be seen that the first end of the fourth segment 1432 is connected to the first end of the third segment 1431, the second end of the fourth segment 1432 is connected to the first current collector 11, the second end of the third segment 1431 is connected to the second of the second segment 1412, the first end of the second segment 1412 is connected to the first end of the first segment 1411, and the second end of the first segment 1411 is connected to the adapter sheet 3 to transfer the current of the first current collector 11 to the adapter sheet 3, and the adapter sheet 3 transfers the current to the outside of the electrode assembly 100, so as to complete the current output of the electrode assembly 100.

According to some embodiments of the present disclosure, as illustrated in FIG. 1, at least one first insulating layer 142 extends to the bending part 143. While the bending condition is ensured, more first insulating layers 142 can cover the bending part 143 to improve the bending stability of the bending part 143, thereby improving the bending stability of the entire first tabs 13.

Figure 3:
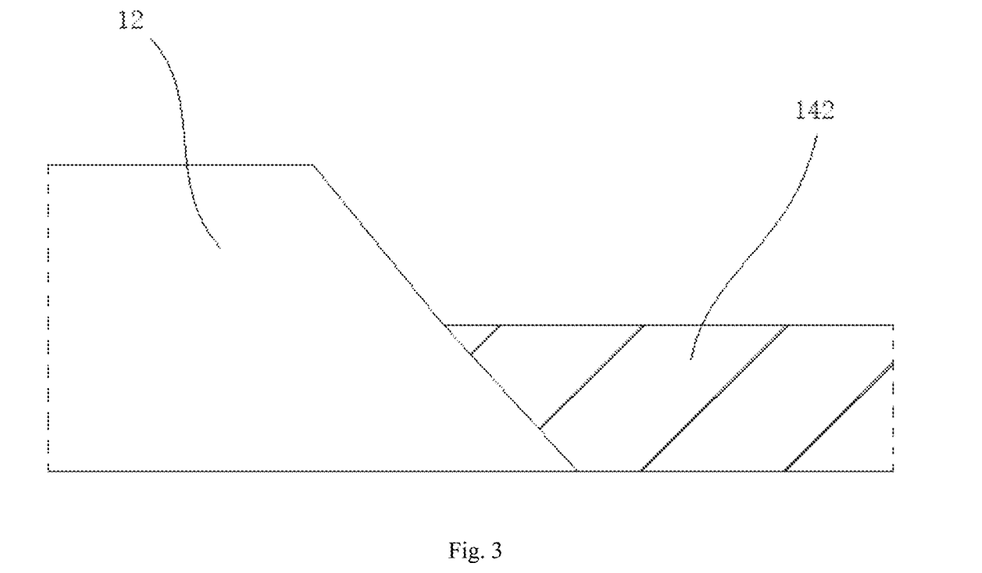
FIG. 3 is a partial enlarged diagram of FIG. 2.

According to some embodiments of the present disclosure, referring to FIGS. 1-3, at least one first insulating layer 142 partially overlaps the first active material layer 12, i.e., the first insulating layer 142 only covers an edge portion of the first active material layer 12 and does not completely cover the first active material layer 12, so as to ensure the insulating effect and the coating convenience of the first electrode sheet 1. In some embodiments, all the first insulating layers 142 partially overlap the first active material layers 12, thereby facilitating processing and improving the insulating effect. Since the process can be simplified by coating the first insulating layer 142 from the first active material layer 12, all the first insulating layers 142 are adapted to be disposed to overlap the end portions of the first active material layers 12.

According to some embodiments of the present disclosure, as illustrated in FIGS. 1 and 2, the electrode assembly 100 further includes a plurality of second electrode sheets 2. In some embodiments, the first electrode sheet 1 may be the cathode of the electrode assembly 100 and the second electrode sheet 2 may be the anode of the electrode assembly 100. Of course, the first electrode sheet 1 may be the anode of the electrode assembly 100 and the second electrode sheet 2 may be the cathode of the electrode assembly 100.

One second electrode sheet 2 is arranged between two adjacent first electrode sheets 1. In other words, the first electrode sheet 1 and the second electrode sheet 2 are arranged in an alternate and stacked manner. The first insulating layer 142 is partially located between the first electrode sheet 1 and the second electrode sheet 2, so as to completely isolate the first electrode sheet 1 from the second electrode sheet 2, thereby preventing the first electrode sheet 1 and the second electrode sheet 2 from being connected with each other to cause a short circuit of the electrode assembly 100, and further ensuring the safety performance of the electrode assembly 100.

According to some embodiments of the present disclosure, referring to FIGS. 1 and 2, a minimum value of a length of the first insulating layer 142 beyond the first active material layer 12 is L1, a maximum value of a length of the second electrode sheet 2 beyond the first active material layer 12 is L2, and a distance from the vertex of the included angle between the first segment 1411 and second segment 1412 to the second electrode sheet is L3, in a direction in which the first tab 13 extends out of the first electrode sheet 1. In other words, a perpendicular distance between an end surface of the second electrode sheet 2 near the breakable part 141 and the first end of the second segment 1412 is L3. L1−L2≥L3. Thus, the entire bending part 143 is more compact to ensure that the position of the breakable part 141 is located within the coverage area of the first insulating layer 142. If the breakable part 141 is located outside the coverage area of the first insulating layer 142, the bending part wastes excessive space in the electrode assembly 100, which is not conducive to improving the energy density of the electrode assembly 100.

According to some embodiments of the present disclosure, a thickness of the first insulating layer 142 is T1, as illustrated in FIGS. 1 and 2, a total thickness of the plurality of first tabs 13 stacked at the connection position between the first segment 1411 and the second segment 1412 is T2, and a minimum value of a perpendicular distance between the bending part 143 and the breakable part 141 in a direction in which the first tab 13 extends out of the first electrode sheet 1 is L4, and L4≥T2. That is, after the plurality of first tabs 13 are bent, their ends are gathered and stacked on the top of the electrode assembly 100, and the top space can accommodate the total height of their stacked ends. The higher the height, the more the occupied space of the entire electrode assembly 100. However, the first tabs 13 do not provide energy, such that the lower the height, the higher the electric capacity of the electrode assembly 100. However, the first tab 13 cannot be located too close to a top end of the housing 4, which would otherwise cause a short circuit due to contact and a breakage of the first tab 13. Therefore, the minimum value of the perpendicular distance between the bending part 143 and the breakable part 141 is set to be greater than or equal to the total thickness of the first tabs 13 after being stacked.

According to some embodiments of the present disclosure, a final relational expression can be derived from the above relational expressions as follows: 0.8*(L1-L2)≥L3≥L4≥1.5*T2. That is, the bending angle and extension length of the first electrode sheet 1 are reasonably controlled within the range of the above relational expression, so as to ensure the overall bending reliability of the first tab 13 while minimizing the space occupied by the first tab 13 in the electrode assembly 100, thereby increasing the electric capacity and energy density of the electrode assembly 100.

Figure 4:
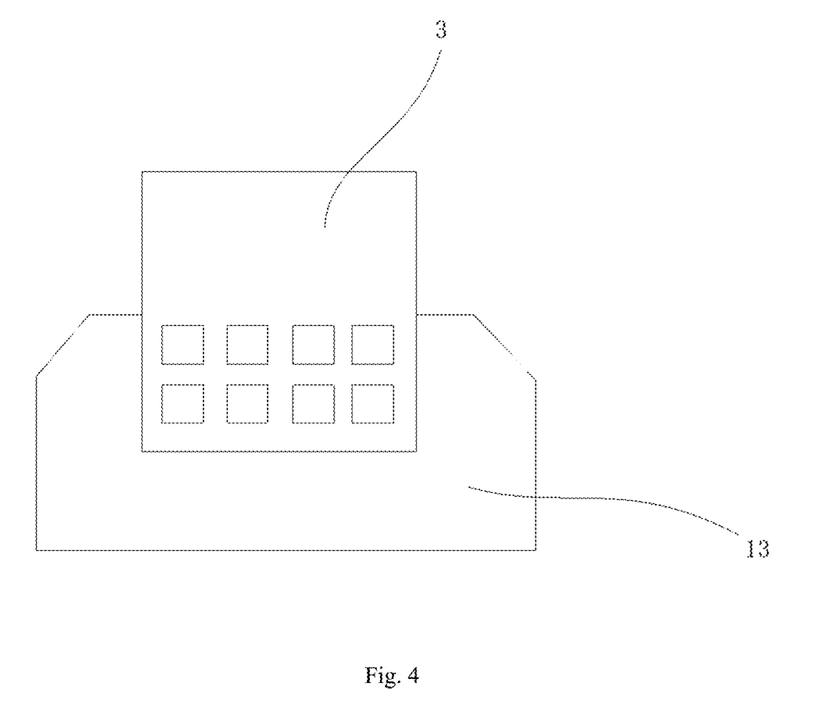
FIG. 4 is a partial structural schematic diagram of an electrode assembly according to embodiments of the present disclosure.
Figure 5:
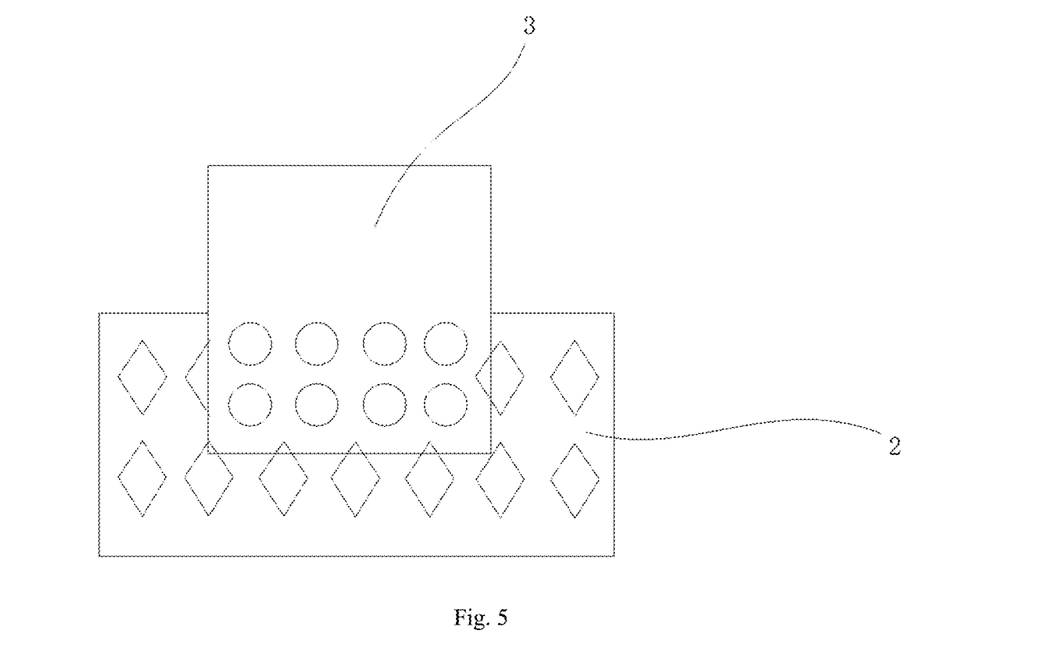
FIG. 5 is a partial structural schematic diagram of an electrode assembly according to embodiments of the present disclosure.
Figure 6:
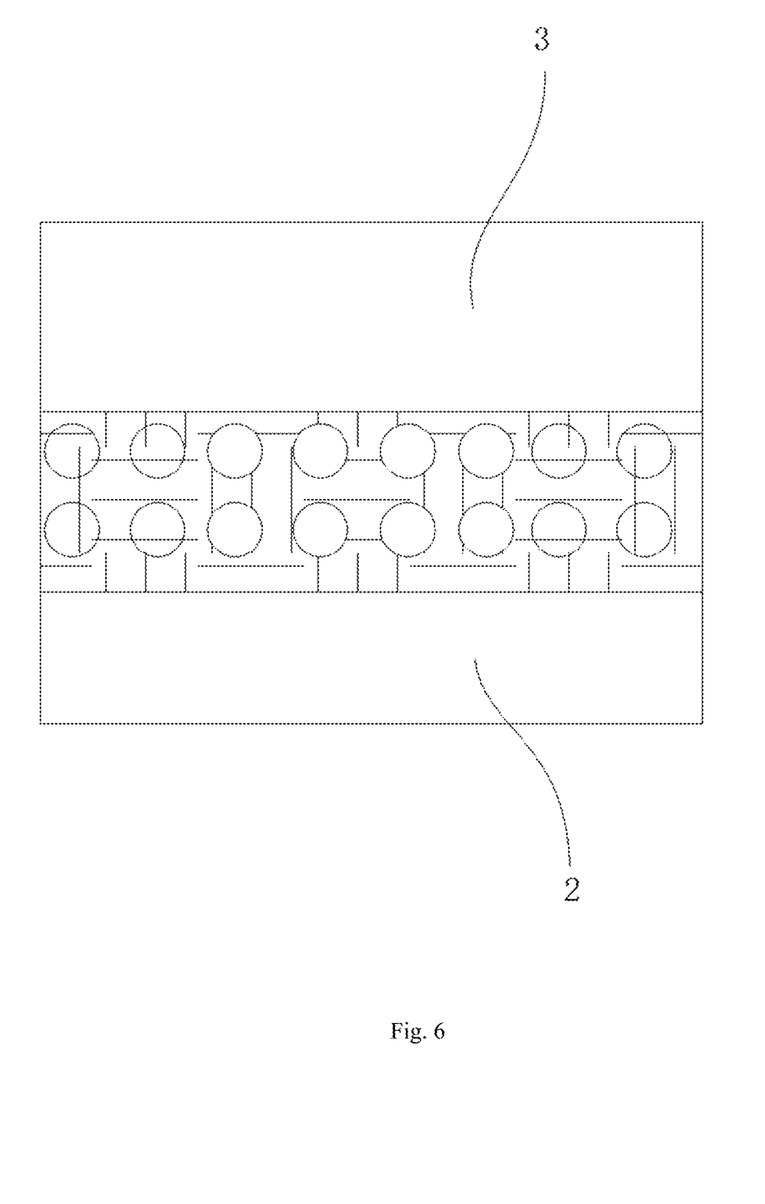
FIG. 6 is a partial structural schematic diagram of an electrode assembly according to embodiments of the present disclosure.

According to some embodiments of the present disclosure, as illustrated in FIGS. 4-6, a welding overlap width of the adapter sheet 3 and the first tab 13 should be controlled between 30% and 80% of the thickness of the electrode assembly 100, so that the ends of the first tab 13 and the adapter sheet 3 reserve a certain width for the bending part 143, i.e., while ensuring the contact area and connection reliability of the electrical connection, the width space of the first insulating layer 142 is reserved, and sharp burrs at the ends can be effectively prevented from scratching and cutting the first tab 13 or the adapter sheet 3.

According to some embodiments of the present disclosure, as illustrated in FIGS. 4-6, a width of the adapter sheet 3 is 50%-100% of a width of the first tab 13. Therefore, the contact area and connection reliability of the electrical connection can be ensured, and corrosion caused by protruded sharp corners piercing the housing 4 can be effectively prevented.

According to some embodiments of the present disclosure, as illustrated in FIGS. 4-6, the two corners of the first tab 13 may be blunted during cutting, such as chamfered, rounded corners, etc. In some embodiments, as illustrated in FIGS. 1-3, at least one side of the weld is covered with an insulating adhesive layer to prevent corrosion and leakage caused by welding burrs piercing the housing 4.

According to some embodiments of the present disclosure, the first tab 13 and the second tab can be directly welded with the adapter sheet 3 at one time. In order to prevent uneven welding caused by displacement and dislocation between the tabs during transportation, a plurality of first tabs 13 or second tabs can be welded and fixed in advance and then secondarily welded with the adapter sheet 3.

According to some embodiments of the present disclosure, as illustrated in FIG. 4, the shape of the welding spot may be quadrilateral. According to some embodiments of the present disclosure, as illustrated in FIGS. 5 and 6, shape of the welding spot may be circular. According to some embodiments of the present disclosure, as illustrated in FIG. 5, the shape of the welding spot may be rhombus.

The electrode assembly 100 according to the embodiments of the present disclosure will be described below with reference to Table 1. It is to be understood that the following description is merely an exemplary illustration and is not a specific limitation of the present disclosure.

TABLE 1

| No. | p/q | T1 (mm) | T2 (mm) | L3 (mm) | L4 (mm) | whether the relation 1 is satisfied (T1 > L3 > L4 > T2) | whether the relation 2 is satisfied (0.8T1 ≥ L3 ≥ 1.5T2) | energy density Wh/L | cracking ratof tab | Micro short circuit of the battery |
|---|---|---|---|---|---|---|---|---|---|---|
| Embodiment 1 | 0% | 0.8 | 0.384 | 1.1 | 0.95 | No | / | 595 | 0 | 1% |
| Embodiment 2 | 10% | 1.1 | 0.384 | 1.1 | 0.95 | No | / | 595 | 0 | 0 |
| Embodiment 3 | 20% | 1.2 | 0.384 | 1.1 | 0.86 | Yes | No | 595 | 0 | 0% |
| Embodiment 4 | 20% | 1.2 | 0.384 | 0.96 | 0.3 | No | / | 600 | 0 | 1% |
| Embodiment 5 | 20% | 1.2 | 0.384 | 0.96 | 0.83 | Yes | Yes | 600 | 0 | 0% |
| Embodiment 6 | 35% | 1.2 | 0.384 | 0.75 | 0.67 | Yes | Yes | 610 | 0% | 0 |
| Embodiment 7 | 40% | 1.2 | 0.384 | 0.576 | 0.49 | Yes | Yes | 615 | 0% | 1% |
| Embodiment 8 | 40% | 1.2 | 0.384 | 0.55 | 0.45 | Yes | No | 615 | 0% | 5% |

TABLE 1-continued

| No. | p/q | T1 (mm) | T2 (mm) | L3 (mm) | L4 (mm) | whether the relation 1 is satisfied (T1 > L3 > L4 > T2) | whether the relation 2 is satisfied (0.8T1 ≥ L3 ≥ 1.5T2) | energy density Wh/L | cracking ratof tab | Micro short circuit of the battery |
|---|---|---|---|---|---|---|---|---|---|---|
| Embodiment 9 | 50% | 1.2 | 0.384 | 0.69 | 0.5 | Yes | Yes | 610 | 1% | 0% |
| Embodiment 10 | 60% | 1.7 | 0.384 | 0.96 | 0.83 | Yes | Yes | 600 | 5% | 0 |
| Embodiment 11 | 80% | 1.5 | 0.384 | 0.576 | 0.49 | Yes | Yes | 615 | 10% | 0 |

The comparison effect shown by the Table is as follows:

Embodiment 1: the relation 1 (T1>L3) is not satisfied, T1 is too short compared to other embodiments, which does not function as insulation of the AT9 coating layer to the positive and negative electrodes, thus easily causing micro-short circuit of the battery.

Embodiment 2: the relation 1 (T1>L3) is not satisfied, T1 is shorter compared to Embodiment 3, and L3 is too long compared to Embodiments 3-11, so that the space occupied by the tab in the battery is larger and the energy density of the battery is reduced.

Embodiment 3: the relation 2 (0.8T1≥L3) is not satisfied. L3 is too long compared to Embodiments 4-7, so that the space occupied by the tab in the battery is larger and the energy density of the battery is reduced.

Embodiment 4: the relation 1 (L4>T2) is not satisfied. L4 is too short compared to other Embodiments, which mean that the tabs are excessively bundled, and the cathode and anode sheets are excessively attached, which easily causes a micro short circuit.

Embodiment 5: both energy density and safety issues are taken into account.

Embodiment 6: both energy density and safety issues are taken into account.

Embodiment 7: both energy density and safety issues are taken into account.

Embodiment 8: the relation 2 (L3≥1.5T2) is not satisfied. The bundled tab is made to approach the cathode and anode sheets more easily than in embodiment 7, causing a micro short circuit.

Embodiment 9: Compared with Embodiments 1-8, the tab crack starts to occur, but the cracking rate of the tab of 1% is still within the controllable range for the safety risk of the battery, which hardly affects the safety of the battery. However, the safety risk of the battery increases rapidly after the cracking rate of the tab exceeds 1%.

Embodiment 10: Compared with Embodiments 1-9, the cracking rate of the tab of 5% is within an uncontrollable range for the battery safety risk, and the battery safety risk is very high.

Embodiment 11: Compared with Embodiments 1-10, the cracking rate of the tab of 10% is still within an uncontrollable range for the battery safety risk, and the battery safety risk is very high.

In the above data, p, q, L1, L2 and T1 are individually adjustable, but when explaining the technical problems, we have fixed these parameters for the time being.

In conclusion, by adjusting the parameters p, q, L1, L2 and T1, the cracking rate of the tab does not exceed 1% as long as p/q is not more than 50%. Furthermore, if the relation 2 is satisfied, the problems of the micro short circuit of the battery exceeding the standard and the energy density being too low can be avoided.

Reference throughout this specification to "an embodiment", "some embodiments", "an example", "a specific example" or "some examples" means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, alternatives, and modifications can be made to the embodiments within the scope of the present disclosure.

What is claimed is:

1. An electrode assembly, comprising:
a plurality of first electrode sheets, each first electrode sheet comprising a first current collector; and
a plurality of first tabs, each first tab extending from a surface of a corresponding first electrode sheet and electrically connected with a corresponding first current collector, the number of the plurality of first tabs being q,
wherein the plurality of first tabs comprise a plurality of first breakable tabs, each first breakable tab comprising a first bending part and a first insulating layer, the first insulating layer wraps the first bending part, the first bending part comprises a first segment and a second segment connected with the first segment, and an included angle at a first bending point formed between the first segment and the second segment is less than 90°, and the first bending point is completely wrapped by the first insulating layer; and
a number of the plurality of first breakable tabs is p, and p/q≤1/2.

2. The electrode assembly according to claim 1, wherein p/q=a, 0.2≤a≤0.4.

3. The electrode assembly according to claim 1, wherein at least one first tab comprises a second bending part, the second bending part comprises a third segment and a fourth segment connected with the third segment, an included angle at a second bending point formed between the third segment and the fourth segment is greater than 90°, and the fourth segment is electrically connected with the first current collector.

4. The electrode assembly according to claim 3, wherein the fourth segment has a first end connected with a first end of the third segment, and a second end electrically connected to the first current collector.

5. The electrode assembly according to claim 3, wherein the first breakable tab comprises the second bending part, the third segment is connected to the second segment, and the third segment and the second segment are collinear.

6. The electrode assembly according to claim 5, wherein at least one first insulating layer covers the second bending part and the second bending point is completely wrapped by the at least one insulating layer.

7. The electrode assembly according to claim 1, wherein the first electrode sheet further comprises a first active material layer located on a surface of the first current collector, and at least one first insulating layer overlaps the first active material layer.

8. The electrode assembly according to claim 7, further comprising a second electrode sheet, the first insulating layer is located between the first electrode sheet and the second electrode sheet.

9. The electrode assembly according to claim 8, wherein in a direction in which a first tab extends out of a corresponding first electrode sheet, a minimum value of a length of the first insulating layer beyond the first active material layer is L1, a maximum value of a length of the second electrode sheet beyond the first active material layer is L2, and a distance from a vertex of the included angle between the first segment and the second segment to the second electrode sheet is L3, and L1−L2≥L3.

10. The electrode assembly according to claim 9, wherein a total thickness of the plurality of first tabs stacked at a connection position between the first segment and the second segment is T2, and a minimum value of a perpendicular distance between the second bending part and the first bending part in a direction in which each first tab extends out of a corresponding first electrode sheet is L4, and L4 is greater than or equal to T2.

11. The electrode assembly according to claim 10, wherein 0.8*(L1−L2)≥L3≥L4≥1.5*T2.

12. The electrode assembly according to claim 1, wherein the plurality of first tabs are configured to be connected with an adapter sheet so as to output current of the electrode assembly.

13. The electrode assembly according to claim 12, wherein the first segment has a first end connected to a first end of the second segment, and a second end connected to the adapter sheet.

14. The electrode assembly according to claim 13, wherein a welding overlap width of the adapter sheet and the plurality of first tabs is controlled between 30% and 80% of a thickness of the electrode assembly.

15. The electrode assembly according to claim 14, wherein the welding includes a plurality of welding spots and a shape of each welding spot is quadrilateral.

16. The electrode assembly according to claim 12, wherein a width of the adapter sheet is 50%-100% of a width of the first tab.

17. The electrode assembly according to claim 1, wherein two corners of each of the plurality of first tabs are blunted during cutting.

18. An electrode assembly, comprising:
a plurality of first electrode sheets stacked in an up-and-down direction, each of the plurality of first electrode sheets comprising a first current collector; and
a plurality of first tabs corresponding to the plurality of first electrode sheets, each of the plurality of first tabs being electrically connected with the first current collector of a respective first electrode sheet, and the number of the plurality of first tabs being q,
wherein the plurality of first tabs comprise a plurality of first breakable tabs, each of the plurality of first breakable tabs comprising a first bending part and a first insulating layer wrapping the first bending part, the first bending part comprises a first segment and a second segment connected with the first segment, and an included angle at a first bending point formed between the first segment and the second segment is less than 90°, and the first bending point is completely wrapped by the first insulating layer, the number of the plurality of first breakable tabs is p, and p/q≤1/2.

19. The electrode assembly according to claim 18, wherein the plurality of first tabs are stacked and connected with each other to connect the plurality of first electrode sheets together so as to complete current collection of the plurality of first electrode sheets.

20. The electrode assembly according to claim 18, wherein the each of the plurality of first breakable tabs comprises a second bending part, the second bending part comprises a third segment and a fourth segment connected with the third segment, an included angle at a second bending point formed between the third segment and the fourth segment is greater than 90°, the second bending point is completely wrapped by the first insulating layer, and the fourth segment is electrically connected with the first current collector.

* * * * *